(12) United States Patent
Liu et al.

(10) Patent No.: US 12,103,417 B2
(45) Date of Patent: Oct. 1, 2024

(54) METAMATERIAL PANEL FOR ENHANCING WIRELESS CHARGING OF ELECTRIC VEHICLES

(71) Applicant: Toyota Motor Engineering & Manufacturing North America, Inc., Plano, TX (US)

(72) Inventors: Yanghe Liu, Ann Arbor, MI (US); Shailesh N. Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 507 days.

(21) Appl. No.: 17/526,432

(22) Filed: Nov. 15, 2021

(65) Prior Publication Data

US 2023/0150383 A1    May 18, 2023

(51) Int. Cl.
*B60L 53/38* (2019.01)
*B60L 53/12* (2019.01)
(Continued)

(52) U.S. Cl.
CPC ............... *B60L 53/38* (2019.02); *B60L 53/12* (2019.02); *B64C 29/0025* (2013.01);
(Continued)

(58) Field of Classification Search
CPC ...... B60L 53/38; B60L 53/12; B60L 2200/10; B60L 53/30; B60L 53/126; B60L 53/36;
(Continued)

(56) References Cited

U.S. PATENT DOCUMENTS

| 9,065,181 B2 | 6/2015 | De Rosny et al. |
| 9,333,870 B2 * | 5/2016 | Kume .................... B60L 53/124 |
| | (Continued) | |

FOREIGN PATENT DOCUMENTS

| CN | 103443883 B | * | 10/2016 | ............. H01F 38/14 |
| CN | 105500851 B | * | 9/2019 | ............. B32B 27/00 |
| | (Continued) | | | |

OTHER PUBLICATIONS

D. Sharma, "Wireless Power Transfer via Metamaterial and Superconducting Coil For Electric Vehicles," 2018 International Conference on Smart City and Emerging Technology (ICSCET), Mumbai, India, 2018, pp. 1-5 (Year: 2018).*

(Continued)

*Primary Examiner* — M Baye Diao
(74) *Attorney, Agent, or Firm* — Christopher G. Darrow; Darrow Mustafa PC (57) ABSTRACT

A panel for wireless charging of an electric vehicle includes a metamaterial panel with a first shape and a second shape different than the first shape. The metamaterial panel is configured to be positioned between a transmitter coil of a wireless power transfer station (WPTS) and a receiver coil of the electric vehicle during wireless charging of the electric vehicle and change between the first shape and the second shape as a function of at least one of a size of the transmitter coil, a size of the receiver coil, and a distance between the transmitter coil and the receiver coil. A robot with at least one of a robotic arm and a robotic buggy can be included and the metamaterial panel can be coupled to the robot. And the robot is configured to position the metamaterial panel between the transmitter coil of the WPTS and the receiver coil of the electric vehicle during wireless charging of the electric vehicle.

20 Claims, 6 Drawing Sheets

(51) Int. Cl.
  *B64C 29/00* (2006.01)
  *B64C 39/02* (2023.01)
  *B64U 50/34* (2023.01)
  *H02J 50/00* (2016.01)

(52) U.S. Cl.
  CPC .......... *B64C 39/024* (2013.01); *H02J 50/005* (2020.01); *B60L 2200/10* (2013.01); *B64U 50/34* (2023.01)

(58) Field of Classification Search
  CPC .. B64C 29/0025; B64C 39/024; H02J 50/005; H02J 50/10; H02J 50/12; H02J 50/90; B64U 50/34; Y02T 90/14; Y02T 10/70; Y02T 10/7072; H01F 38/14
  USPC ........................................................ 320/108
  See application file for complete search history.

(56) References Cited

U.S. PATENT DOCUMENTS

| | | | |
|---|---|---|---|
| 9,853,485 B2 | 12/2017 | Contopanagos | |
| 9,873,346 B2* | 1/2018 | Maekawa | B60L 53/36 |
| 9,931,952 B2* | 4/2018 | Tripathi | H02J 50/12 |
| 10,044,235 B2* | 8/2018 | Takatsu | E04H 6/24 |
| 10,177,594 B2 | 1/2019 | Contopanagos | |
| 10,449,866 B2* | 10/2019 | Seong | H04B 5/79 |
| 10,476,314 B2* | 11/2019 | Maekawa | B60L 53/126 |
| 10,491,029 B2 | 11/2019 | Hosseini | |
| 11,167,652 B2* | 11/2021 | Krammer | H01F 38/14 |
| 11,228,212 B2* | 1/2022 | Yoon | H02J 50/20 |
| 11,296,554 B2* | 4/2022 | Logan | B60L 1/00 |
| 11,329,517 B2* | 5/2022 | Yoon | H01Q 15/0086 |
| 11,332,025 B2* | 5/2022 | Parimi | H02J 50/40 |
| 11,451,093 B2* | 9/2022 | Lin | H01F 38/14 |
| 11,515,728 B2* | 11/2022 | Yang | B60L 53/12 |
| 11,735,956 B2* | 8/2023 | Pei | H02J 50/80 320/108 |
| 11,888,327 B2* | 1/2024 | Yoon | H02J 50/12 |
| 2016/0144727 A1* | 5/2016 | Tokura | H02J 50/12 307/104 |
| 2016/0257209 A1* | 9/2016 | Lewis | B60L 53/126 |
| 2017/0001531 A1* | 1/2017 | Takatsu | B60L 53/65 |
| 2018/0056794 A1* | 3/2018 | Kim | B60L 53/126 |
| 2018/0257502 A1* | 9/2018 | Park | H02J 50/12 |
| 2021/0265873 A1* | 8/2021 | Yoon | H01F 38/14 |
| 2021/0320531 A1* | 10/2021 | Yoon | H01Q 15/0086 |
| 2022/0038136 A1* | 2/2022 | Cabrol | H04B 5/72 |
| 2023/0268114 A1* | 8/2023 | Song | H02J 50/005 336/55 |

FOREIGN PATENT DOCUMENTS

| | | | | |
|---|---|---|---|---|
| KR | 20160073303 A | * | 6/2016 | ............. H02J 17/00 |
| KR | 101689264 B1 | | 1/2017 | |
| KR | 101694950 B1 | * | 1/2017 | ........... H04B 5/0037 |
| WO | 2013027029 A1 | | 2/2013 | |
| WO | 2021140344 A1 | | 7/2021 | |

OTHER PUBLICATIONS

B. Wang, K. H. Teo, T. Nishino, W. Yerazunis, J. Barnwell and Jinyun Zhang, "Wireless power transfer with metamaterials," Proceedings of the 5th European Conference on Antennas and Propagation (EUCAP), Rome, Italy, 2011, pp. 3905-3908. (Year: 2011).*

M. Song, P. Kapitanova, I. Iorsh and P. Belov, "Metamaterials for wireless power transfer," 2015 Days on Diffraction (DD), St. Petersburg, Russia, 2015, pp. 1-4. (Year: 2015).*

Cho et al. "Thin PCB-type metamaterials for improved efficiency and reduced EMF leakage in wireless power transfer systems", published in IEEE Transactions on Microwave Theory and Techniques vol. 64, No. 2 (2016).

* cited by examiner

METAMATERIAL PANEL FOR ENHANCING WIRELESS CHARGING OF ELECTRIC VEHICLES

TECHNICAL FIELD

The present disclosure generally relates to wireless charging and, more particularly, to wireless charging of electric vehicles.

BACKGROUND

Electric vehicles (EVs) can be wirelessly charged automatically without the use of electric cables. Particularly, an inductive wireless power transfer system (WPTS) with a transmitter coil located proximate or near an EV (e.g., buried in pavement or in a transmitter pad on the pavement) generates an alternating electromagnetic field that intersects a receiver coil of the EV. Intersection of the alternating electromagnetic field with the receiver coil creates an alternating current in the receiver coil and a power converter (e.g., a rectifier) draws the alternating current from the receiver coil and converts the alternating current to direct current that charges a battery of the EV.

Inductive WPTSs transmit more power than other (e.g., capacitive) WPTSs due at least in part to relatively higher energy densities of the alternating electromagnetic field in free space. However, if the space or gap between the transmitter coil and the receiver coil is greater than a desired distance, efficiency of a wireless charge is reduced. In addition, different sizes and/or shapes between transmitter coils and receiver coils can result in reduced wireless charging efficiency.

The present disclosure addresses the issues of wireless charging efficiency during wireless charging of EVs, among other issues related to wireless charging of EVs.

SUMMARY

This section provides a general summary of the disclosure, and is not a comprehensive disclosure of its full scope or all of its features.

In one form of the present disclosure, a panel for wireless charging of an electric vehicle includes a metamaterial panel with a first shape and a second shape different than the first shape. The metamaterial panel is configured to be positioned between a transmitter coil of a wireless power transfer station and a receiver coil of the electric vehicle during wireless charging of the electric vehicle and change between the first shape and the second shape as a function of at least one of a size of the transmitter coil, a size of the receiver coil, and a distance between the transmitter coil and the receiver coil.

In another form of the present disclosure, a panel for wireless charging an electric vehicle includes a metamaterial panel configured to change shape from a first shape to a second shape different than the first shape, and from the second shape and the first shape. A robot including a robotic arm and/or a robotic vehicle is included and the metamaterial panel is coupled to the robot. The robot is configured to position the metamaterial panel between a transmitter coil of a charging station and a receiver coil of the electric vehicle during wireless charging of the electric vehicle.

In still another form of the present disclosure, a panel for wireless charging an electric vehicle includes a metamaterial panel configured to change shape from a first shape to a second shape different than the first shape, and from the second shape and the first shape, and a robot with a control system. The robot includes at least one of a robotic arm and a robotic vehicle, and the metamaterial panel is coupled to the robot. The controller is configured to command the metamaterial panel to change shape and configured to command the robot to position the metamaterial panel between a transmitter coil of a charging station and a receiver coil of the electric vehicle during wireless charging of the electric vehicle.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to metamaterial panels that focus alternating electromagnetic fields to increase wireless charging efficiency and decrease electromagnetic field leakage during wireless charging of EVs (e.g., eVTOLs electric automobiles, and electric trucks, among others). The metamaterial panels can have more than one shape such that changes in distance between a transmitter coil of a wireless charging station and a receiver coil of the EV, and different shapes and/or sizes between transmitter coils and receiver coils are compensated for during wireless charging of EVs. In some variations of the present disclosure, a robotic vehicle and/or a robotic arm moves and positions one or more metamaterial panels between the transmitter coil of the wireless charging station and the receiver coil of an EV.

Figure 1A:
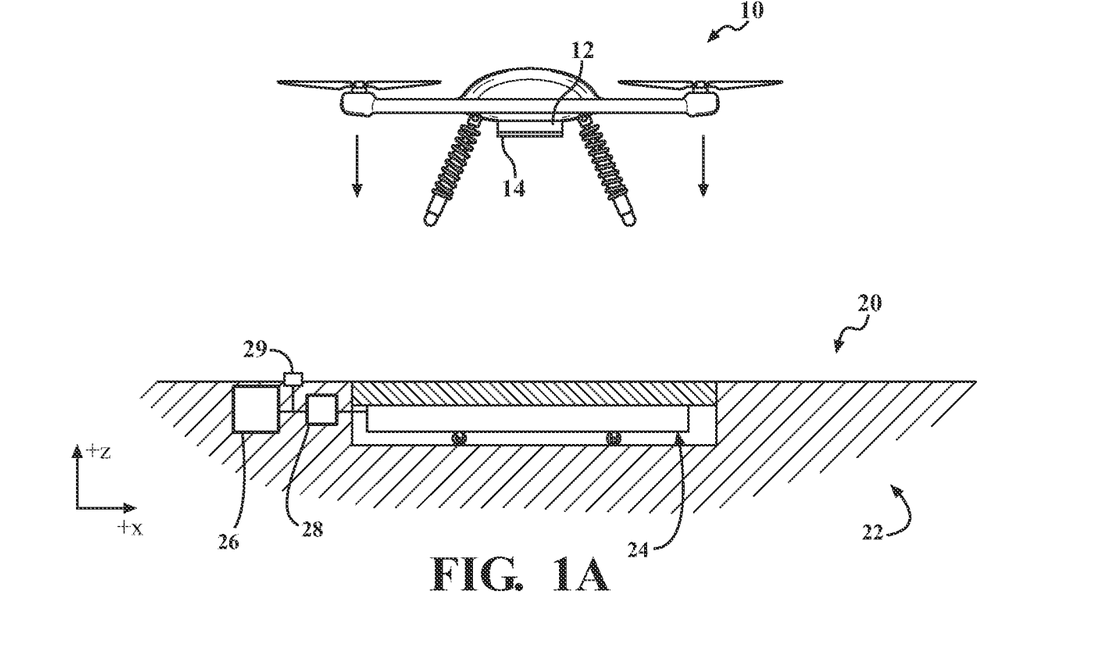
FIG. 1A is a front view of an electric vertical takeoff and landing (eVTOL) vehicle approaching a wireless charging station.
Figure 1B:
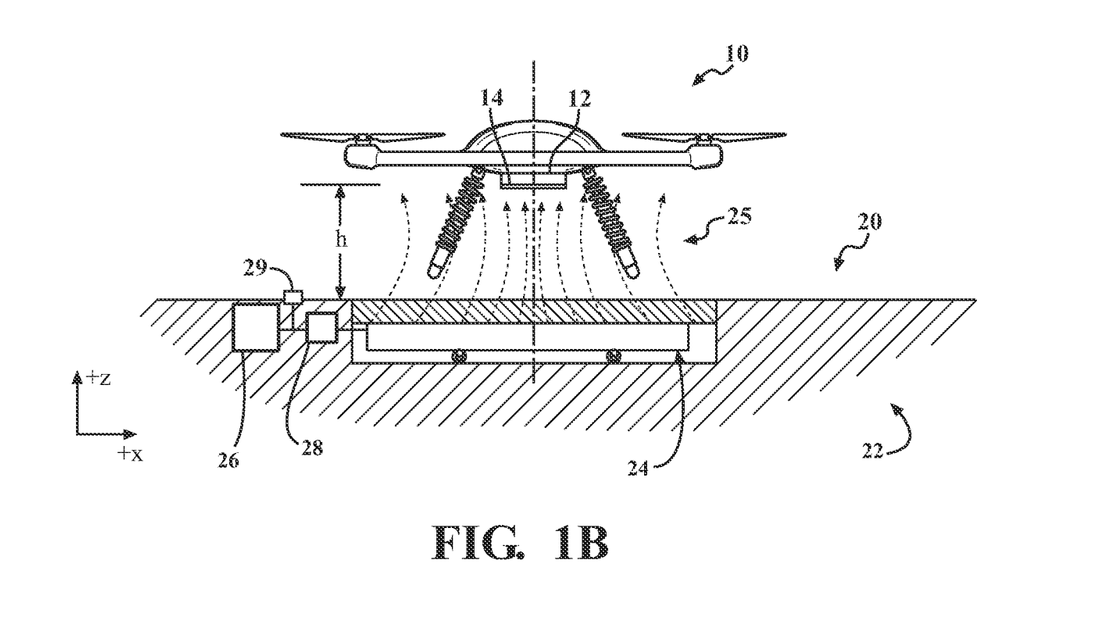
FIG. 1B is a front view of the eVTOL vehicle in FIG. 1A during wirelessly charging of the eVTOL vehicle.

Referring to FIGS. 1A and 1B, a front view of an eVTOL vehicle 10 approaching an inductive WPTS 20 is shown in FIG. 1A and wireless charging of the eVTOL vehicle 10 at the inductive WPTS 20 is shown in FIG. 1A. The eVTOL vehicle 10 vehicle incudes a battery 12 and a receiver coil 14, and the inductive WPTS 20 includes a charging station 22 with a transmitter coil 24, a power source 26, a processor 28, and at least one sensor 29. The receiver coil 14 is positioned a distance 'h1' from the transmitter coil 24 during wireless charging and the transmitter coil 24 generates an alternating electromagnetic field 25 that intersects the receiver coil 14. It should be understood that the eVTOL vehicle 10 can hover at the distance h1 during wireless charging, or in the alternative, the eVTOL vehicle 10 can land and be supported on the inductive WPTS 20 (or some structure associate with the inductive WPTS 20) with the distance h1 being between the receiver coil 14 and the transmitter coil 24 during wireless charging. However, and due at least in part to the distance h1 between the receiver coil 14 and the transmitter coil 24, fluctuations of the distance h1 during wireless charging, the shape and size of the receiver coil 14, and/or the shape and size of the transmitter coil 24, only a portion of the alternating electromagnetic field 25 intersects the receiver coil 14. In some variations, the at least one sensor 29 includes a distance or proximity sensor 29 configured to detect or determine a distance between the receiver coil 14 and the transmitter coil 24. And in such variations the proximity sensor 29 can provide a signal to the processor 28 and the processor 28 can initiate wireless charging of the eVTOL vehicle 10 when the receiver coil 14 is at the distance h1 from the transmitter coil 24.

Figure 2:
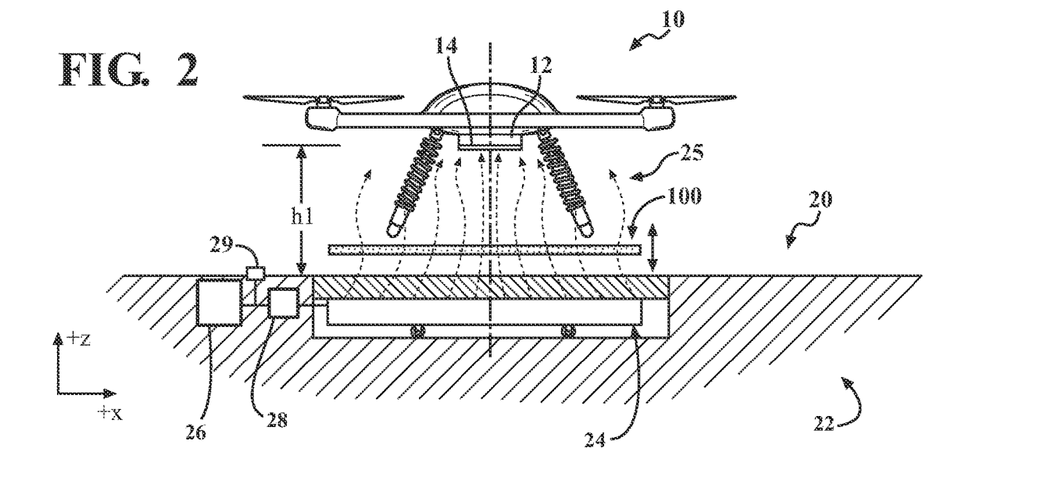
FIG. 2 is a front view of the eVTOL vehicle in FIG. 1B with a metamaterial panel in a first shape between a transmitter coil of an inductive WPTS and a receiver coil of the eVTOL vehicle according to the teachings of the present disclosure.

Referring now to FIG. 2, wireless charging of the eVTOL vehicle 10 using a metamaterial panel 100 according to the teachings of the present disclosure is shown. The metamaterial panel 100 is positioned between the receiver coil 14 of the eVTOL vehicle 10 and the transmitter coil 24 of the inductive WPTS 20 and, as illustrated in FIG. 2, the metamaterial panel 100 focuses the alternating electromagnetic field 25 onto the receiver coil 14. That is, the metamaterial panel 100 "bends" the alternating electromagnetic field 25 such that more of the alternating electromagnetic field 25 intersects the receiver coil 14 when compared to the metamaterial panel 100 not being present or used (FIG. 1A). Accordingly, the metamaterial panel 100 focuses the alternating electromagnetic field 25 onto the receiver coil 14 such that the efficiency of wireless charging the eVTOL vehicle 10 is enhanced (increases) and electromagnetic field leakage is decreased compared to when the metamaterial panel 100 is not present or used.

As used herein, the term "metamaterial panel" refers to at least one layer of a negative-index metamaterial configured to bend or focus an outgoing electromagnetic field from a transmitter coil that is diverging from a transverse axis of the transmitter coil (e.g., transverse axis 'A' of transmitter coil 24 in FIG. 1B) back towards the transverse axis (e.g., see electromagnetic field 25 in FIG. 2). And in some variations the metamaterial panel(s) disclosed herein is a printed circuit board (PCB) metamaterial panel with a metamaterial layer on one or both sides of a circuit board substrate.

Not being bound by theory, metamaterials and metamaterial panels disclosed herein have a negative reflective index with an artificial periodic index such that the metamaterial has a negative relative permittivity and/or a negative relative permeability, e.g., as disclosed in the publication "Thin PCB-type metamaterials for improved efficiency and reduced EMF leakage in wireless power transfer systems", *Microwave Theory and Techniques* 64.2 (2016): 353-364, by Cho et al., which is incorporated herein in its entirety by reference. In addition, the resonance frequency, the relative permeability, and the thickness of the metamaterial layer(s) are configured to enhance focusing of the alternating electromagnetic field 25 with intermediate frequencies between 1 kHz to 10 MHz.

While an eVTOL vehicle 10 is shown in FIGS. 1A-2, it should be understood that other vehicles, including but not limited to electric motor vehicles (e.g., see FIG. 12), watercraft, an aircraft, a space craft, a golf cart, a motorcycle, and/or any other form of motorized transport are included in the teachings of the present disclosure. In addition, the eVTOL vehicle 10, and other electric vehicles disclosed herein, can be a battery electric vehicle, a plug-in hybrid electric vehicle, or any other form of electric vehicle.

Figure 3A:
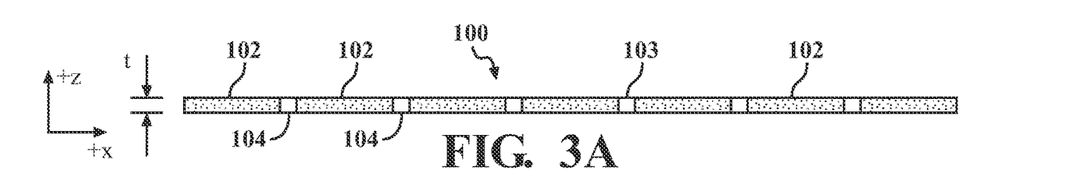
FIG. 3A is an isolated front view of the metamaterial panel in FIG. 2.
Figure 3B:
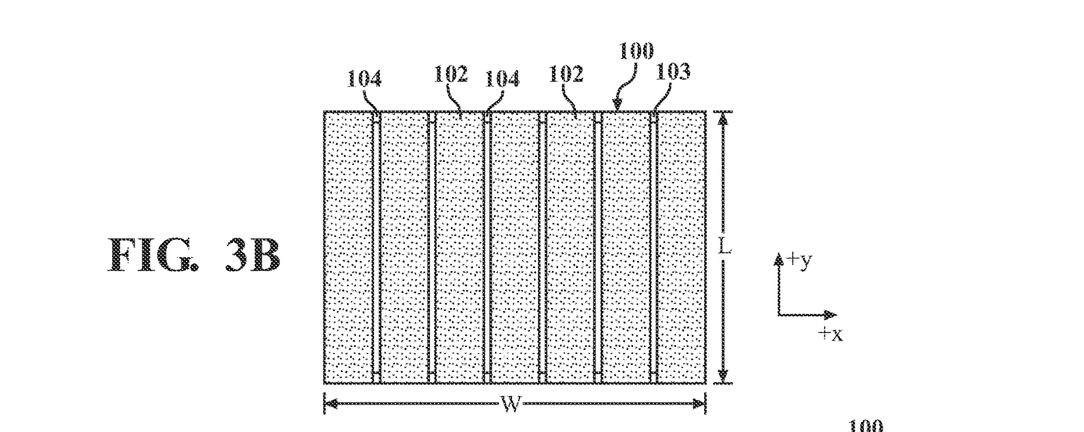
FIG. 3B is a top view of the metamaterial panel in FIG. 3A.
Figure 3C:
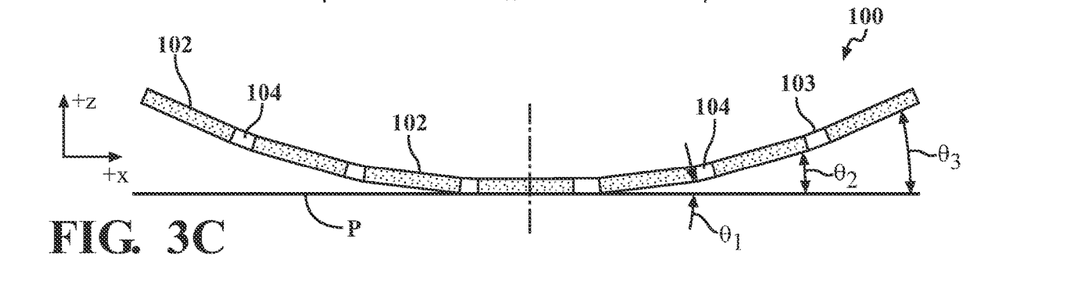
FIG. 3C is a side view of the metamaterial panel in FIG. 3A in a non-planar configuration (shape)

Referring to FIGS. 3A-3C, isolated views of the metamaterial panel 100 are shown. In some variations the metamaterial panel 100 includes a plurality of metamaterial sub-panels 102 (also referred to herein simply as "sub-panels 102") coupled to each other with a frame 103. And in at least one variation, the sub-panels 102 are configured to be positioned or orientated at a non-zero angle ($\theta$) relative to each other and a reference plane 'P' as shown in FIG. 3C. In some variations, angles between one or more of the sub-panels 102 are equal to each other (e.g., $\theta_1 = \theta_2 = \theta_3$), while in other variations angles between one or more of the sub-panels 102 are not equal to each other (e.g., $\theta_1 \neq \theta_2 \neq \theta_3$). In at least one variation, the sub-panels 102 are configured to be positioned or orientated at a non-zero angle ($\theta$) relative to the reference plane P using one or more hinges 104 between adjacent sub-panels 102, while in other variations the sub-panels 102 are configured to be positioned or orientated at a non-zero angle (θ) relative to the reference plane P without the use of hinges. For example, the frame 103 can include one or more malleable material portions (e.g., malleable polymer portions) that are configured to be formed into a desired shape without breaking or cracking and/or one or more shape memory material portions (e.g., shape memory polymer portions) configured to be formed into a desired shape without breaking or cracking.

Figure 4:
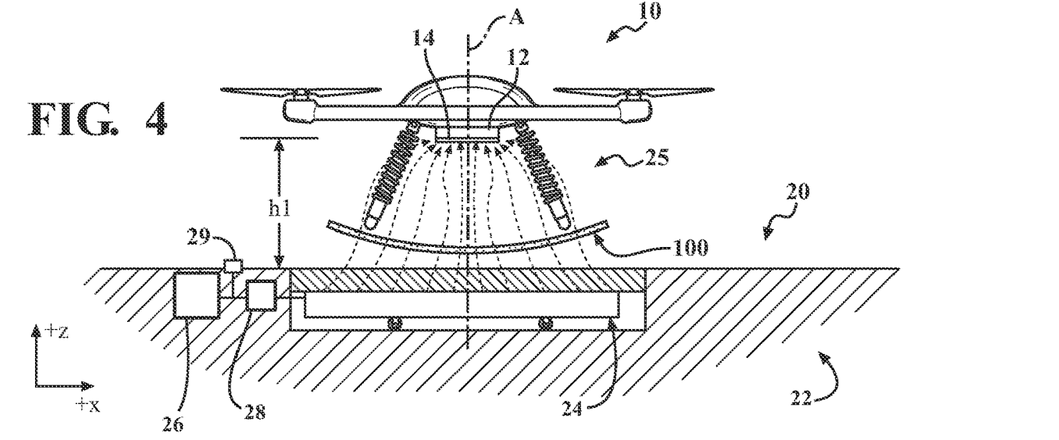
FIG. 4 is a front view of the eVTOL in FIG. 1A with the metamaterial panel in FIG. 2 in a second shape between the transmitter coil of the inductive WPTS and the receiver coil of the eVTOL vehicle according to the teachings of the present disclosure.
Figure 5:
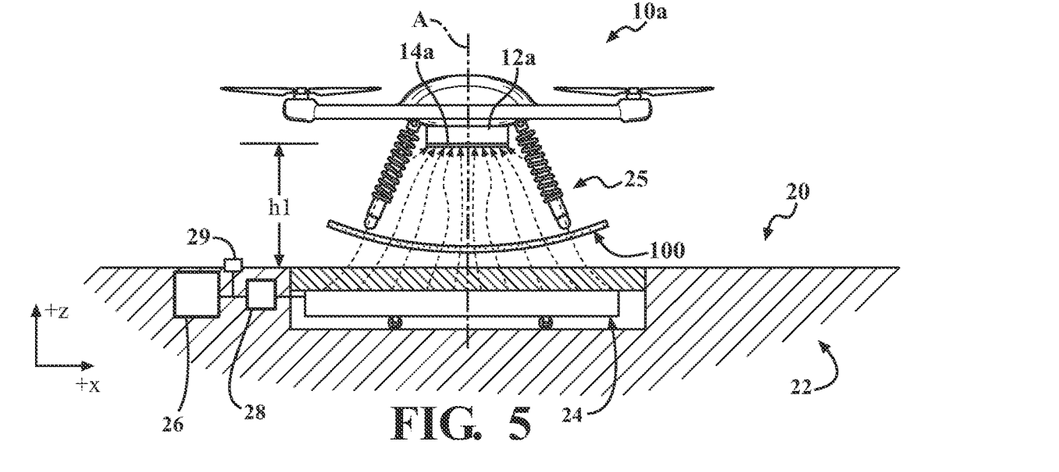
FIG. 5 is a front view of another eVTOL vehicle with the metamaterial panel in FIG. 2 in a third shape between the transmitter coil of the inductive WPTS and a receiver coil of the eVTOL vehicle according to the teachings of the present disclosure.
Figure 6:
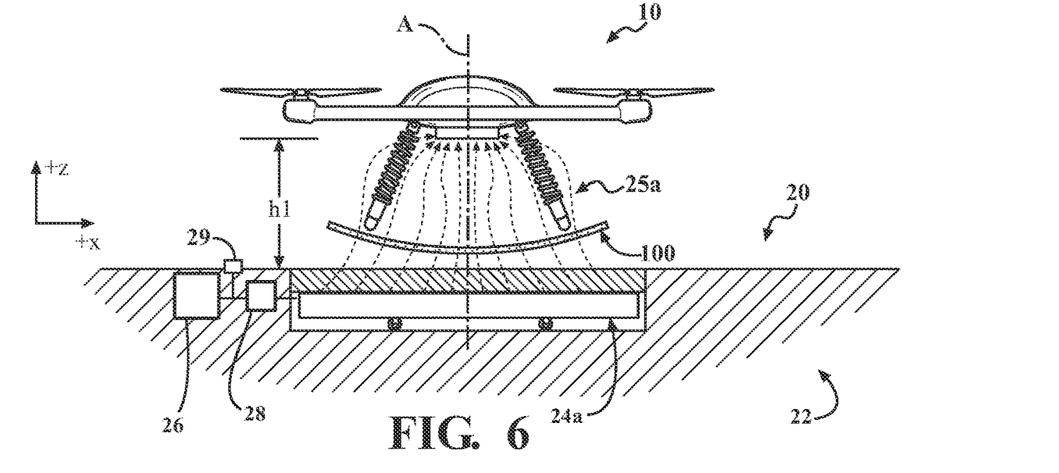
FIG. 6 is a front view of the eVTOL in FIG. 1A with the metamaterial panel in FIG. 2 in a fourth shape between another transmitter coil of the inductive WPTS and the receiver coil of the eVTOL vehicle according to the teachings of the present disclosure.

Referring now to FIGS. 4-6, non-limiting examples of the metamaterial panel 100 in a non-planar configuration during wireless charging are shown. For example, FIG. 4 shows the metamaterial panel 100 in a second shape compared to a first shape shown in FIG. 2, and the metamaterial panel 100 in the second shape enhances focusing of the alternating electromagnetic field 25 onto the receiver coil 14 of the eVTOL vehicle 10 compared to the metamaterial panel in the first shape. Referring particularly to FIG. 5, the metamaterial panel 100 is in a third shape compared to the second shape shown in FIG. 4 and the third shape has a larger radius of curvature such that the alternating electromagnetic field 25 is focused onto a receiver coil 14a of an eVTOL vehicle 10a that is larger than the receiver coil 14 of the eVTOL vehicle 10. That is, the shape of the metamaterial panel 100 is adjusted such that the efficiency of wireless charging the eVTOL vehicles 10, 10a using the same transmitter coil 24 is enhanced even though receiver coils 14, 14a, have different sizes. And with reference to FIG. 6, the metamaterial panel 100 is in a fourth shape that enhances focusing of an alternating electromagnetic field 25a generated from a transmitter coil 24a that is larger than the transmitter coil 24 shown in FIGS. 4 and 5. That is, the shape of the metamaterial panel 100 is adjusted such that the efficiency of wireless charging the eVTOL vehicle 10 is enhanced even though the transmitter coils 24, 24a have different sizes.

Positioning the metamaterial panel 100 between a receiver coil of an EV and a transmitter coil of a WPTS is performed or provided manually, automatically, or a combination thereof. For example, and with reference to FIG. 7, in some variations the metamaterial panel 100 is coupled to a vehicle 30 and the metamaterial panel 100 is rolled into a desired position between a transmitter coil of a WPTS and a receiver coil of an electric vehicle. In such variations the vehicle 30 can include one or more wheels 310, a base 320 for mounting or coupling to the metamaterial panel 100, and one or more height actuators 330 coupled to the base 320 and configured to move the metamaterial panel in a height direction (z direction). In operation, the vehicle 30 rolls on a surface 'S' and positions the metamaterial panel 100 between a transmitter coil of a WPTS and a receiver coil of an electric vehicle. In addition, the one or more height actuators 330 are configured to adjust the height of the metamaterial panel 100 relative to a transmitter coil and receiver coil, and thereby enhance the efficiency of wireless charging a given or particular electric vehicle.

Figure 7:
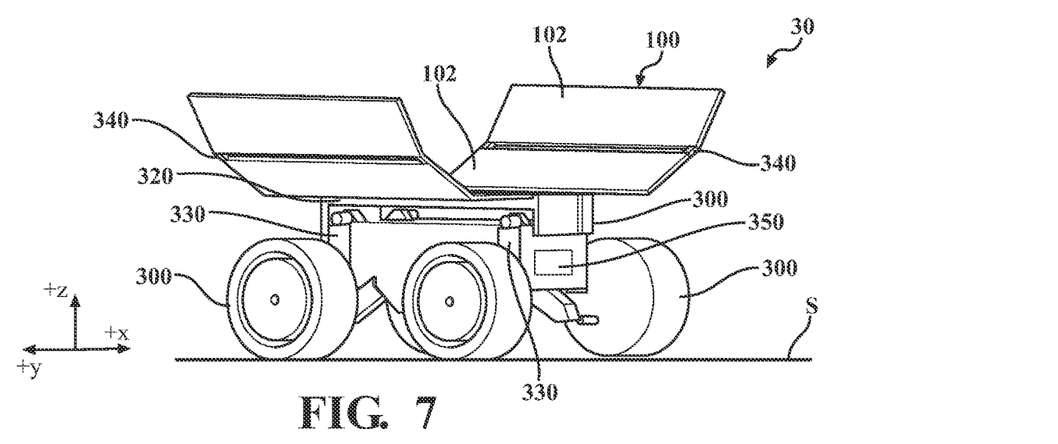
FIG. 7 is a perspective view of a robotic vehicle with the metamaterial panel in FIGS. 3A-3C according to the teachings of the present disclosure.

In some variations the vehicle 30 includes one or more shape actuators 340 configured to adjust and change the shape of the metamaterial panel 100 as discussed above. And in such variations the one or more shape actuators 340 can be activated manually to change the shape of the metamaterial panel 100 and/or the vehicle 30 can be a robotic vehicle 30 with a control system 350 configured to receive a signal and command the one or more shape actuators 340 to change the shape of the metamaterial panel 100. A "control system" as used herein includes any device, component, system, element or arrangement or groups thereof that enable information/data to be used to control the robotic vehicle 30 and/or the metamaterial panel 100.

In at least one variation the control system 350 is configured to receive a signal command the one or more shape actuators 340 to change the shape of the metamaterial panel 100 into one of a plurality of different shapes depending on a given electric vehicle to be or being wirelessly charged and/or as a function of the received signal, e.g., from a first shape to a second shape, from a second shape to a third shape, from the third shape back to the first shape, from the first shape to the third shape, from the third shape to the second shape, among others. In addition, in some variations the control system 350 is configured to command a motor (not shown) of the robotic vehicle 30 in response to receiving a signal such that the robotic vehicle 30 rolls across the surface S into a desired position between a transmitter coil of a WPTS and a receiver coil of an electric vehicle.

It should be understood that the components of the vehicle 30 (i.e., the wheels 310, base 320, actuators 330 and/or 340, and control system 350) are either transparent to alternating electromagnetic fields or are shielded from alternating electromagnetic fields. For example, the wheels 310, base 320, and actuators 330 and/or 340 can be made from polymer materials and the control system 350 and any electrical components of the robotic vehicle can be shielded with a ferrite material.

Figure 8:
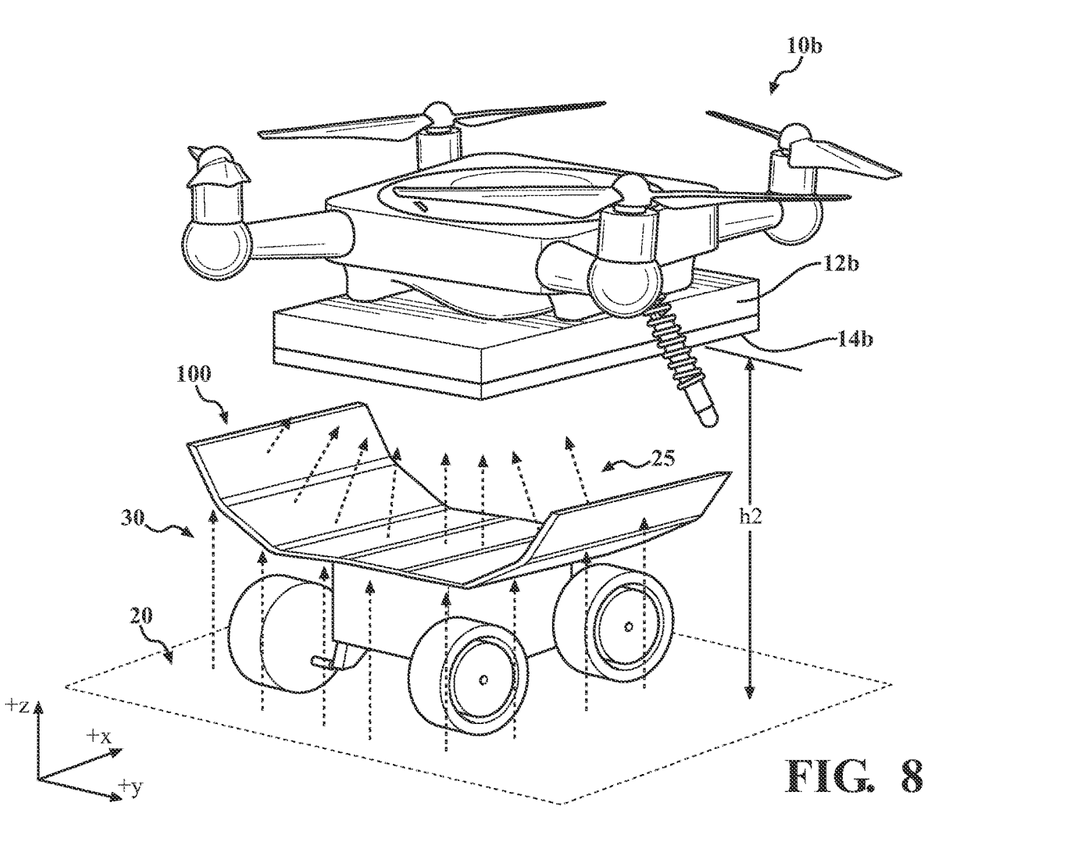
FIG. 8 is a perspective view of the robotic vehicle in FIG. 7 positioned between a transmitter coil of an inductive WPTS and a receiver coil of an eVTOL vehicle according to the teachings of the present disclosure.

Referring to FIG. 8, the vehicle 30 with the metamaterial panel 100 has rolled into a position between the inductive WPTS 20 and an eVTOL vehicle 10b with a battery 12b (i.e., a battery pack) and a receiver coil 14b. The eVTOL vehicle 10b is positioned at a distance or height 'h2' from the inductive WPTS 20 and the metamaterial panel 100 is in a non-planar configuration such that an alternating electromagnetic field 25 generated from the transmitter coil 24 (FIG. 5) is focused on the receiver coil 14b.

Figure 9:
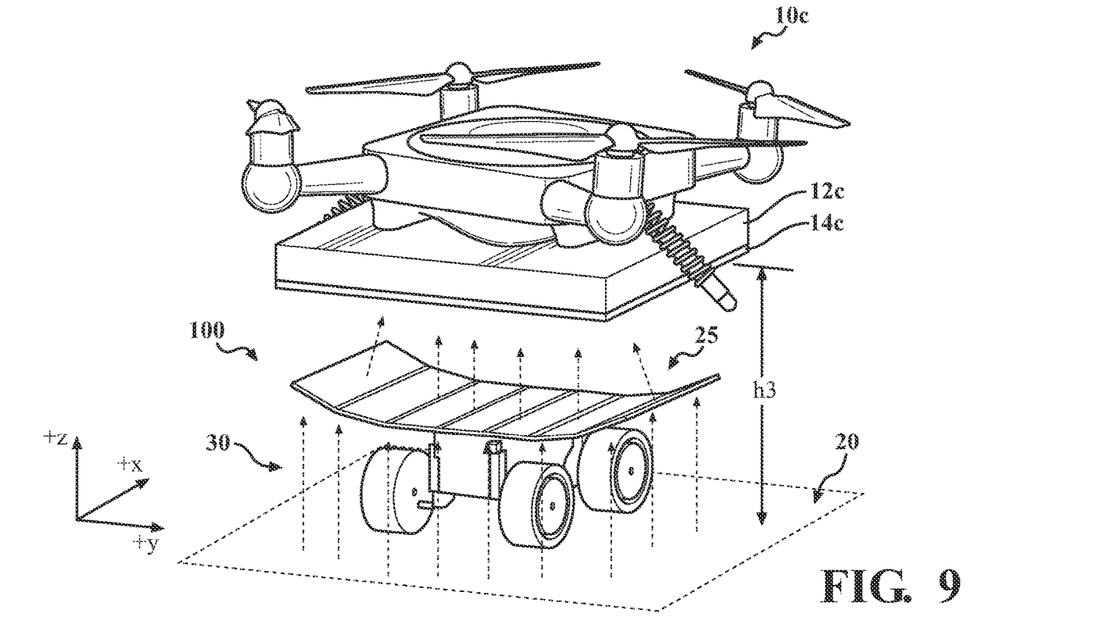
FIG. 9 is a perspective view of the robotic vehicle in FIG. 7 between a transmitter coil of an inductive WPTS and a receiver coil of another eVTOL vehicle according to the teachings of the present disclosure.

Referring to FIG. 9, the vehicle 30 with the metamaterial panel 100 has been rolled into a position between the inductive WPTS 20 and another eVTOL vehicle 10c with a battery 12c and a receiver coil 14c. The receiver coil 14c is larger in size than the receiver coil 14b shown in FIG. 8 and the receiver coil 14c is positioned at a distance or height 'h3' (which may or may not be equal to h2) from the transmitter coil 24 (FIG. 5). Also, the metamaterial panel 100 is in a non-planar configuration such that the alternating electromagnetic field 25b generated from a transmitter coil (not shown) is focused on the receiver coil 14c. Accordingly, the vehicle 30 with the metamaterial panel 100 provides enhanced wireless charging efficiency and reduced alternating electromagnetic field leakage between a given WPTS and a plurality of eVTOLs having different shapes and sizes. Also, it should be understood that in variations where the eVTOL vehicles 10b, 10c are hovering over the inductive WPTS 20, and the heights h2, h3 vary during wireless charging, the control system 350 can be configured to change the shape of the metamaterial panel 100 such that the alternating electromagnetic field 25 remains desirably focused on the receiver coils 14b, 14c.

Figure 10:
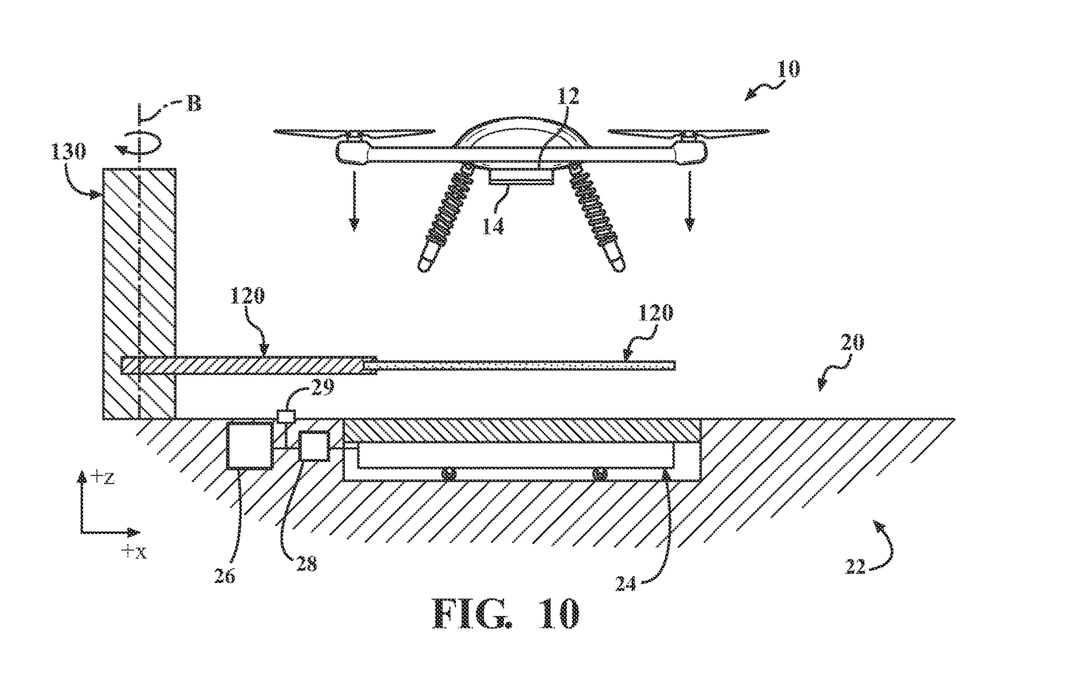
FIG. 10 is a front view of the eVTOL vehicle in FIG. 1A approaching an inductive WPTS with a robotic arm coupled to the metamaterial panel in FIGS. 3A-3C according to the teachings of the present disclosure.
Figure 11:
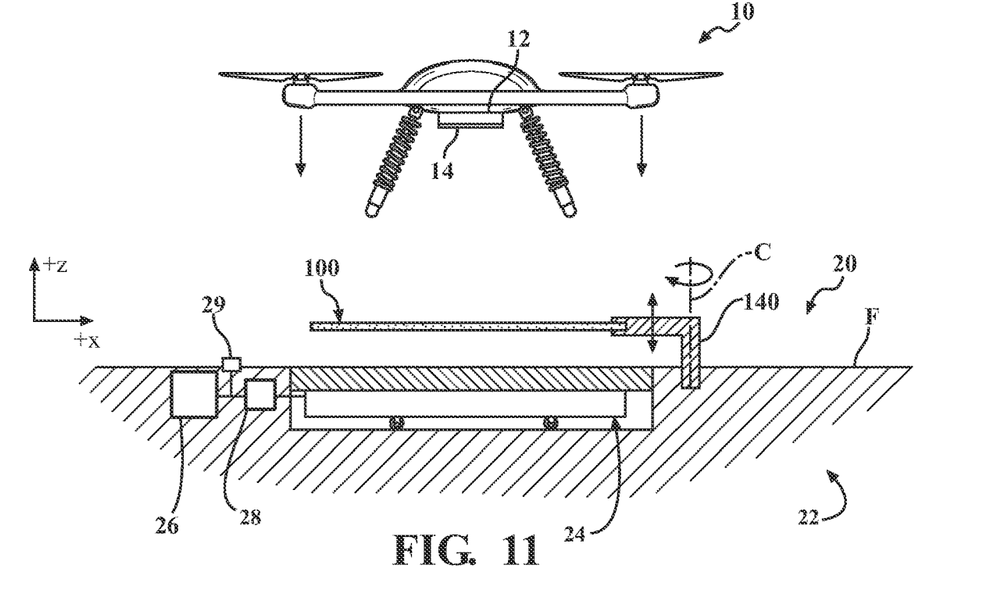
FIG. 11 is a front view of the eVTOL vehicle in FIG. 1A approaching an inductive WPTS with a robotic arm coupled to the metamaterial panel in FIGS. 3A-3C according to the teachings of the present disclosure.

While FIGS. 7-9 show the metamaterial panel coupled to a vehicle, it should be understood that the metamaterial panel 100 can be coupled to members or other structures that move and position the metamaterial panel 100 into a desired position. For example, and with reference to FIG. 10, in some variations the metamaterial panel 100 is couple to an arm 120 that extends from a column or wall 130. In such variations the arm 120 can rotate about an axis 'B' such that the metamaterial panel 100 is rotated to a position between the inductive WPTS 20 and the eVTOL vehicle 10. In addition, in some variations the arm 120 is configured to move up and down (+/−z direction) in order to adjust the height of the metamaterial panel 100 between the transmitter coil 24 of the inductive WPTS 20 and the receiver coil 14 of the eVTOL vehicle 10. And referring to FIG. 11, in at least one variation the metamaterial panel 100 is couple to an arm 140 that extends from a floor 'F'. In such variations the arm 140 can rotate about an axis 'C' such that the metamaterial panel 100 is rotated to a position between the inductive WPTS 20 and the eVTOL vehicle 10. In addition, in some variations the arm 140 is configured to move up and down (+/−z direction) in order to adjust the height of the metamaterial panel 100 between the transmitter coil 24 of the inductive WPTS 20 and the receiver coil 14 of the eVTOL vehicle 10.

In some variations the arm 120 and/or the arm 140 is a robotic arm configured to be commanded by a control system 125 (FIG. 10), 145 (FIG. 11) to move the metamaterial panel 100 into a desired position between the transmitter coil 24 of the inductive WPTS 20 and the receiver coil 14 of the eVTOL vehicle 10. And in such variations the control system 125, 145 can be configured to command one or more shape actuators (not shown) to change the shape of the metamaterial panel 100 into one of a plurality of different shapes depending on a given electric vehicle to be or being wirelessly charged. In addition, and while the arms 120, 140 are shown holding the metamaterial panel 100 in a horizontal position (i.e., in the x-y plane), in some variations the arm 120 and/or the arm 140 are configured to move and position the metamaterial panel 100 in a vertical position (e.g., the y-z plane). For example, in some variations the inductive WPTS 20 includes a transmitter coil 24 extending along the z-axis (i.e., vertically) shown in FIGS. 10 and 11 such that eVTOLs with a vertically oriented receiver coil can be wirelessly charged while hovering or stationed horizontal to the vertical transmitter coil 24. And in such variations, the arms 120, 140 hold the metamaterial panel 100 in a vertical orientation between the vertical transmitter coil 24 and a vertically oriented receiver coil of an eVTOL.

Figure 12:
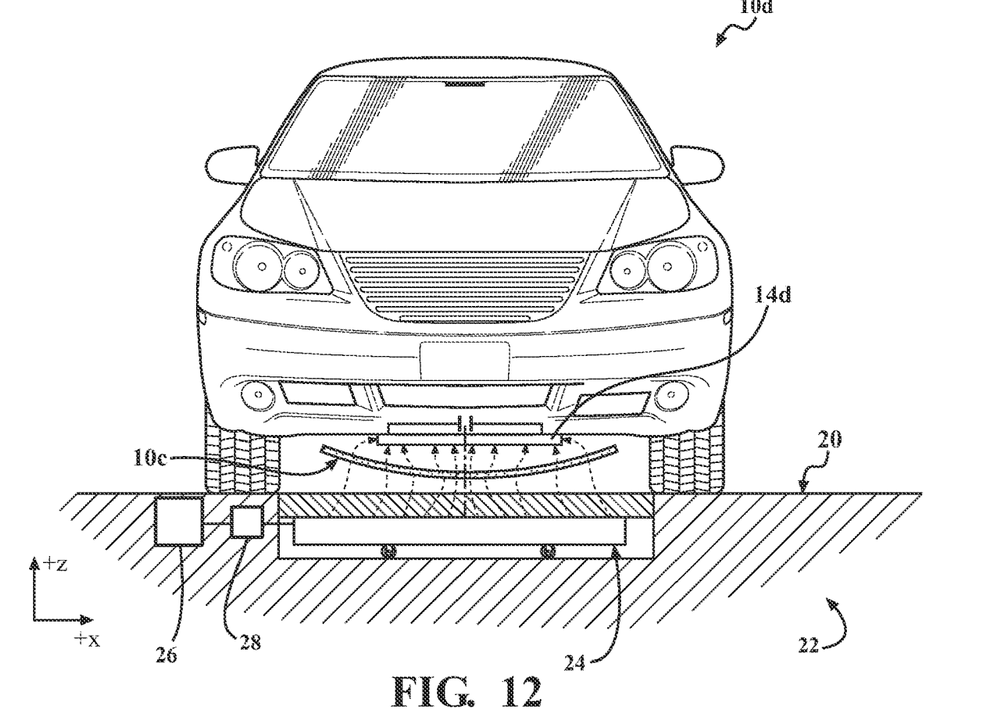
FIG. 12 is a front view of an electric vehicle with the metamaterial panel in FIGS. 3A-3C between a transmitter coil of an inductive WPTS and a receiver coil of the electric vehicle according to the teachings of the present disclosure.

Referring to FIG. 12, wireless charging an EV 10*d*, i.e., an electric automobile, using the metamaterial panel 100 is shown. It should be understood that the metamaterial panel 100 is positioned between the transmitter coil 24 of the inductive WPTS 20 and a receiver coil 14*d* of the EV 10*d* such that wireless charging efficiency is enhanced. It should also be understood that the metamaterial panel 100 can be moved and positioned between the transmitter coil 24 and the receiver coil 14*d*, and change shape, using the same or similar vehicle, arms, and/or control systems as described above.

The foregoing description is merely illustrative in nature and is in no way intended to limit the disclosure, its application, or uses. For example, it should be understood that fins with shapes and sizes different than the fins described above are included within the teachings of the present disclosure. Also, work of the presently named inventors, to the extent it may be described in this background section, as well as aspects of the description that may not otherwise qualify as prior art at the time of filing, are neither expressly nor impliedly admitted as prior art against the present technology.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A panel for wireless charging of an electric vehicle comprising:

a metamaterial panel comprising a first shape and a second shape different than the first shape, wherein the metamaterial panel is configured to be positioned between a transmitter coil of a wireless power transfer station (WPTS) and a receiver coil of the electric vehicle during wireless charging of the electric vehicle and change between the first shape and the second shape as a function of at least one of a size of the transmitter coil, a size of the receiver coil, and a distance between the transmitter coil and the receiver coil.

2. The panel according to claim 1, wherein the metamaterial panel comprises a plurality of metamaterial sub-panels coupled together to form the metamaterial panel.

3. The panel according to claim 2 further comprising at least one hinge between adjacent metamaterial sub-panels such that the adjacent metamaterial sub-panels are configured to be oriented at an angle relative to each other, wherein the angle is greater than or less than zero.

4. The panel according to claim 1 further comprising a robot, wherein the metamaterial panel is coupled to the robot and the robot is configured to move and position the metamaterial panel between the transmitter coil of the WPTS and the receiver coil of the electric vehicle.

5. The panel according to claim 4, wherein the robot comprises a robotic arm coupled to the metamaterial panel and the robotic arm is configured to rotate about an axis such that the metamaterial panel rotates into a position between the transmitter coil of the WPTS and the receiver coil of the electric vehicle.

6. The panel according to claim 5, wherein the robotic arm is configured to move the metamaterial panel in a direction transverse to the transmitter coil of the WPTS such that a distance between the metamaterial panel and the transmitter coil is adjustable.

7. The panel according to claim 4, wherein the robot comprises a robotic vehicle coupled to the metamaterial panel and the robotic vehicle is configured to roll and position the metamaterial panel between the transmitter coil of the WPTS and the receiver coil of the electric vehicle.

8. The panel according to claim 7, wherein the robotic vehicle comprises one or more height actuators configured to move the metamaterial panel in a direction transverse to the transmitter coil of the WPTS such that a distance between the metamaterial panel and the transmitter coil is adjustable.

9. The panel according to claim 1, wherein the metamaterial panel with the first shape is configured for wireless charging a first electric vehicle with a first receiver coil having a first size, and the metamaterial panel with the second shape is configured for wireless charging a second electric vehicle with a second receiver coil having a second size different than the first size.

10. The panel according to claim 1, wherein the metamaterial panel with the first shape is configured for wireless charging a first electric vehicle with a receiver coil positioned a first distance from the transmitter coil of the WPTS, and the metamaterial panel with the second shape is configured for wireless charging a second electric vehicle with a receiver coil positioned a second distance different than the first distance from the transmitter coil of the WPTS.

11. The panel according to claim 1, wherein the metamaterial panel is configured to change shape and be positioned between the transmitter coil of the WPTS and a receiver coil of an electric vertical takeoff and land (eVTOL) vehicle during wireless charging efficiency of the eVTOL vehicle.

12. The panel according to claim 1 further comprising a control system, wherein the control system is configured to receive a signal and command the metamaterial panel, as a function of the received signal, to at least one of change from the first shape to the second shape and change shape from the second shape to the first shape.

13. The panel according to claim 1, wherein the metamaterial panel is configured to be orientated horizontally between the transmitter coil of the WPTS and the receiver coil of the electric vehicle.

14. The panel according to claim 1, wherein the metamaterial panel is configured to be orientated vertically between the transmitter coil of the WPTS and the receiver coil of the electric vehicle.

15. A panel for wireless charging an electric vehicle, the panel comprising:
a metamaterial panel configured to change shape from a first shape and a second shape different than the first shape, and from the second shape to the first shape; and
a robot comprising at least one of a robotic arm and a robotic buggy, wherein the metamaterial panel is coupled to the robot and the robot is configured to position the metamaterial panel between a transmitter coil of a wireless power transfer station (WPTS) and a receiver coil of the electric vehicle during wireless charging of the electric vehicle.

16. The panel according to claim 15 further comprising a control system, wherein the control system is configured to receive a signal and command the metamaterial panel, as a function of the received signal, to at least one of change from the first shape to the second shape and change from the second shape to the first shape.

17. The panel according to claim 16, wherein the control system is configured to command the metamaterial panel as a function of at least one of a size of the transmitter coil, a size of the receiver coil, and a distance between the transmitter coil and the receiver coil.

18. A panel for wireless charging an electric vehicle, the panel comprising:
a metamaterial panel configured to change shape from a first shape to a second shape different than the first shape, and from the second shape to the first shape; and
a robot comprising a control system and at least one of a robotic arm and a robotic vehicle, wherein the metamaterial panel is coupled to the robot and the control system is configured to command the metamaterial panel to change shape and configured to command the robot to position the metamaterial panel between a transmitter coil of a wireless power transfer station (WPTS) and a receiver coil of the electric vehicle during wireless charging of the electric vehicle.

19. The panel according to claim 18, wherein the control system is configured to command the metamaterial panel as a function of at least one of a size of the transmitter coil, a size of the receiver coil, and a distance between the transmitter coil and the receiver coil.

20. The panel according to claim 19, wherein the robot is configured to configured to position the metamaterial panel between at least one of a horizontally oriented transmitter coil and receiver coil and a vertically oriented transmitter coil and receiver coil.

* * * * *